United States Patent

Von Walter

[11] 3,842,236
[45] Oct. 15, 1974

[54] PROCESS TO CONTROL THE MOVEMENT OF A WORKPIECE WITH RESPECT TO A BEAM OF A STOCK PROCESSING MACHINE OPERATING BY MEANS OF CONTROLLABLE POWER IRRADIATION

[75] Inventor: Alfred Von Walter, Munich, Germany

[73] Assignee: Steigerwald Strahltechnik GmbH, Munich, Germany

[22] Filed: Jan. 18, 1973

[21] Appl. No.: 324,885

Related U.S. Application Data

[63] Continuation-in-part of Ser. No. 128,811, March 29, 1971, abandoned.

[30] Foreign Application Priority Data

Mar. 28, 1970 Germany.............................. 2015078

[52] U.S. Cl..................... 219/121 EM, 219/121 EB
[51] Int. Cl............................................ B23k 15/00
[58] Field of Search............... 219/121 EB, 121 EM; 250/49.5 A, 49.5 TE; 315/10, 22

[56] References Cited
UNITED STATES PATENTS

| | | | |
|---|---|---|---|
| 3,644,700 | 2/1972 | Kruppa et al................. | 219/121 EB |
| 3,648,048 | 3/1972 | Cahan et al.................... | 250/49.5 A |
| 3,651,303 | 3/1972 | Rehme et al.................. | 219/121 EB |
| 3,699,334 | 10/1972 | Cohen et al. ................ | 250/49.5 TE |

*Primary Examiner*—J. V. Truhe
*Assistant Examiner*—G. R. Peterson
*Attorney, Agent, or Firm*—Sandoe, Hopgood & Calimafde

[57] ABSTRACT

The invention relates to apparatus and method for controlling the machining or processing of a workpiece by means of a controllable beam of radiant energy which may be a charge carrier beam, an electron beam, a laser beam, or the like. The invention is directed to apparatus and method for the control of the movement of a workpiece with respect to the machining beam of radiant energy. During movement of the workpiece, its instantaneous position is compared with a programmed position and the deviation between the instantaneous position and the programmed position are compensated for by adjustment of the beam whenever the inertia of the workpiece would prevent movement of the workpiece to eliminate the deviation. As a result, the beam becomes an inertia-free controllable tool by means of which controlled displacement cycles of the beam with very high speeds can be achieved. As a result, it is possible to compensate by control of the machining beam of radiant energy for the shaking motions of the workpiece carrier which are transmitted to the workpiece.

3 Claims, 4 Drawing Figures

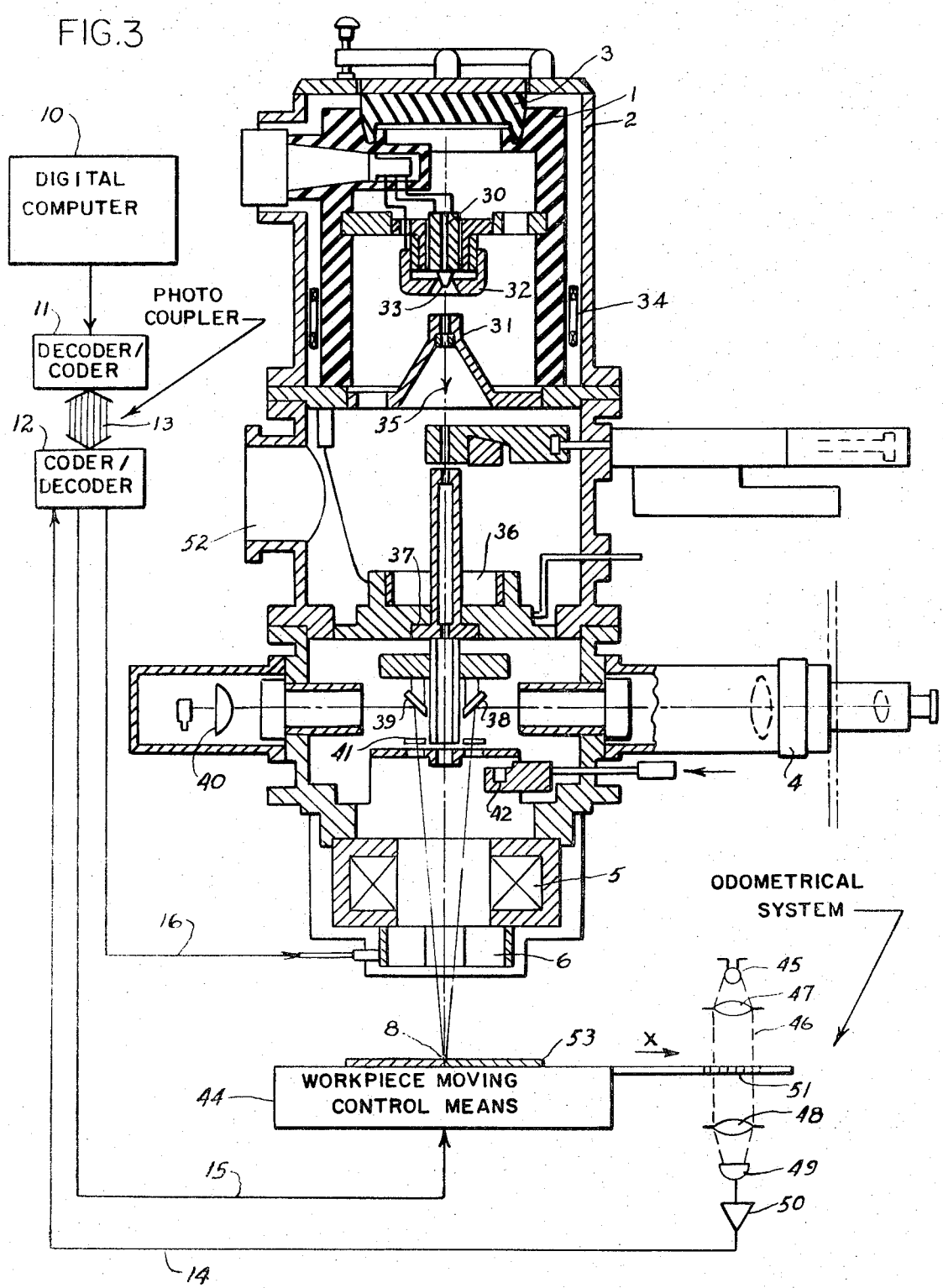

PROCESS TO CONTROL THE MOVEMENT OF A WORKPIECE WITH RESPECT TO A BEAM OF A STOCK PROCESSING MACHINE OPERATING BY MEANS OF CONTROLLABLE POWER IRRADIATION

This application is a continuation-in-part of application Ser. No. 128,811, filed Mar. 29, 1971 now abandoned. The invention relates to a method for the control of the movement of a workpiece with respect to a beam of a stock processing machine operating by means of a controllable beam of radiant energy, by using a workpiece carrier movable at will with respect to the beam.

With stock processing or treatment by means of beams or radiant energy, e.g., in drilling, milling, engraving, perforating, welding or hardening, the particular machining result desired can be predetermined as a rule by the form, the intensity, and the duration of the effect of the beam of radiant energy acting substantially as a tool, which beam may be, for example, a charge carrier beam or else a laser beam.

If one considers as a premise that the form and the intensity of the beam to impinge upon the workpiece to be machined are predetermined in such a way by the corresponding parameters of the beam generator and that they are inalterable over the entire machining period, the machining result, especially its quality, then depend essentially only on the possibility of keeping also the power input per unit of time and per each individual area or volume element of the workpiece zones to be processed at least substantially constant during the machining (deliberate temporary and/or local changes in the power input are to be disregarded in this connection for the time being).

Now as a rule the given machining problem requires a movement of the point of incidence of the machining beam of radiant energy to be performed in a certain manner of the workpiece surface or, for example, also along the butt joint of two workpieces to be welded together. It can readily be seen that, e.g., in the welding of two workpieces, to achieve the uniformity and quality of the welding seam to be formed, the crucial question is whether a uniform power input can be guaranteed by the machining or processing beam of radiant energy. Such a constancy of the power input per unit of time during the machining cycle presupposes, however, the possibility of achieving a relative movement between the workpiece and the point of incidence of the beam of radiant energy, the aggregate velocity of which is invariable over the entire machining cycle.

To bring about the required movement of the workpiece or workpieces with respect to the machining beam of radiant energy, one uses with the stock processing machines known in the art, e.g., with electron beam welding machines, displacement mechanisms within the working chamber. The displacement mechanisms are as a rule designed in such a way that they permit a displacement and possibly also a horizontal swing of a bed or table carrying the workpiece or workpieces into one or several different coordinate or rotary directions to produce (as a result), for example, longer or relatively complex welding seams, while the focused beam of radiant energy is set in constant position on one working area.

However, a rather disadvantageous effect is exercised in this connection by the inertia of such mechanical displacement devices, as well as the inertia of their driving units, since it is, for example, not possible to perform changes in direction from the $x$ into the $y$ direction while maintaining a uniform relative speed between the workpiece and the beam of radiant energy and especially also because the accelerations and decelerations of the feed movements respectively required upon starting and braking of the displacement device prevent the maintaining of a constant machining speed during the corresponding intervals. As a result, during such variable-rate relative movements between the workpiece and the beam, the power input with regard to the respective volume elements of the workpiece is, for example, greater than would be required for the purpose of achieving the desired machining result which is accordingly non-uniform, and therefore the machining quality leaves something to be desired.

The invention comprises a method for the control of the movement of a workpiece with respect to a machining beam of radiant energy and has as its particular object to overcome the problems occurring with the aforementioned machining difficulties and to provide means for the control of the movement with the application of which one can achieve uniform machining results in any case even with the most complex machining shapes.

According to the invention, during the movement of the workpiece its actual position at any given moment is compared with a preset position and at least the non-compensatable deviations from the preset position resulting from the inertia of the workpiece movement or its controllability are compensated for substantially by an adjusting of the beam.

With the method according to the invention, one may, for example, presuppose that the workpiece carrier or workpiece table movable in any direction with respect to the machining beam of radiant energy is coupled in such a way with a control device that the workpiece table is to travel along a preset path in the $x/y$ plane according to corresponding coordinate signals of the control device. In that case, the driving mechanism of the workpiece table is controlled by the coordinate signals.

Now in view of the fact that the method according to the invention provides for a continuous comparison of the actual position of the workpiece or the workpiece table at any given moment with the preset position, error signals can be generated in the event of deviations, to be fed in turn into the control device to form correction signals for the adjusting of the workpiece table so that, by this means alone, there could already be achieved a compensation of the deviations of the workpiece table from its preset path. However, in view of the inertia of such a purely mechanical adjustment, a 100 percent compensation is not yet possible. Such a compensation is brought about according to the invention only by an additional correction of the machining beam of radiant energy. On the other hand, the method according to the invention also permits, under certain circumstances, a compensation of the determined deviations from the preset value exclusively through the correcting of the beam of radiant energy as, for example, if there is to be no mechanical adjustment of the workpiece or the workpiece table.

The instant invention makes use with great benefit of the fact that a beam of radiant energy, e.g., a charge carrier beam, represents a practically inertia-free controllable tool, by comparison to the mechanism of devices for the displacement of workpieces with respect to the beam, and thus one can perform controlled displacement cycles with very high control speeds since such a beam of radiant energy is capable of responding immediately to actuation by electronic control signals. The method according to the invention makes it therefore possible to compensate practically without any delay, by means of a controllable adjustment of the machining beam of radiant energy, the nonneutralization deviations of the workpiece from the path to be travelled during a machining cycle caused by the inertia of the workpiece displacement or the inertia of the mechanically operating displacement control, particularly velocity fluctuations in the workpiece movement, so that the desired machining result cannot be impaired, with regard to shape and quality, by positional deviations of the workpiece from its "preset path."

By means of the method according to the invention, it is, for example, possible to compensate immediately, by appropriately influencing the machining beam of radiant energy, for the inevitable shaking motions occurring during the movement of the workpiece carrier and which are transmitted to the workpiece.

Another advantage of the method according to the invention can be seen in that, besides the comparison of the preset and the actual values regarding the workpiece position, there are being compared simultaneously the actual value of speed and the actual direction, of the workpiece movement with a preset speed and a preset direction and the resultant deviations from the preset value of speed and the preset direction are compensated by an adjustment of the beam of radiant energy. This may likewise involve at least such speed deviations which cannot be compensated for as a result of the inertia of the workpiece movement controllability.

According to a further development of the invention, for the purpose of determining the actual position and the actual speed of the workpiece at any given time, there can be performed a continuous comparison of the preset and the actual values with regard to the position of the workpiece or the workpiece carrier at any given moment with respect to the geometric-optical axis of the beam generator.

In certain applications it may also be advantageous if, to determine the actual position of the workpiece at any given moment, there is performed a continuous comparison between the preset and the actual value regarding the position of the workpiece or the workpiece carrier at a given moment, especially with respect to the point of incidence of the power beam on the workpiece surface (work area).

In any event, the particular advantages of the method according to the invention are fully realized if the movement control of the workpiece or the workpiece carrier takes place automatically. Furthermore, on the basis of the deviations, defined above, of the actual position or the actual speed of the workpiece or workpiece carrier, from the corresponding preset values, control signals influencing or adjusting the beam can be generated automatically. Such control signals can, for example, be used preferably to control the path of the machining power beam with respect to at least two dimensions, e.g., according to the x and y coordinates of a Cartesian coordinate system which one might imagine to be projected onto the workpiece surface. Such control signals are preferably used to control deflection systems for the beam of radiant energy. The control signals may furthermore comprise information on possible deviations of the actual focus position of the machining beam from its preset focus position and may therefore serve also to control the focus position of the beam in the direction of the beam axis.

With certain machining tasks it may furthermore be advantageous if, within the framework of the method according to the invention, one controls, in addition, e.g., according to a program, the power current and/or the power current density of the beam of radiant energy especially in performing precision machining.

The method according to the invention uses, for example, an electron beam as a practically inertialess controllable beam of radiant energy. The advantageous possibilities for the purpose of thermal machining of material in general, and which result from the application of an electron beam, may be presumed to be known to the person skilled in the art, thereby making a detailed discussion at this point unnecessary.

The method according to the invention offers, furthermore, the advantageous possibility that in order to continuously determine a preset position of the workpiece at any given moment during a machining cycle from stored working track parameters, to perform the continuous comparison of the preset and actual values with respect to the position at any given moment and-/or the relative speed of the workpiece being moved under control of a workpiece moving control means as a function of the preset position, to determine any deviation of the actual position at that given moment from the preset position, and to compensate the deviation by adjusting of the point of incidence of the beam on the workpiece relative to the moving workpiece, one can use an appropriately designed electronic data processing plant.

The drawings provide further explanations of the invention and illustrate in the form of exemplified embodiments in which:

FIG. 3 is a cross-sectional view of the electron beam generator of an electron beam processing machine, exhibiting a device for performing the method according to the invention.

Figure 1:
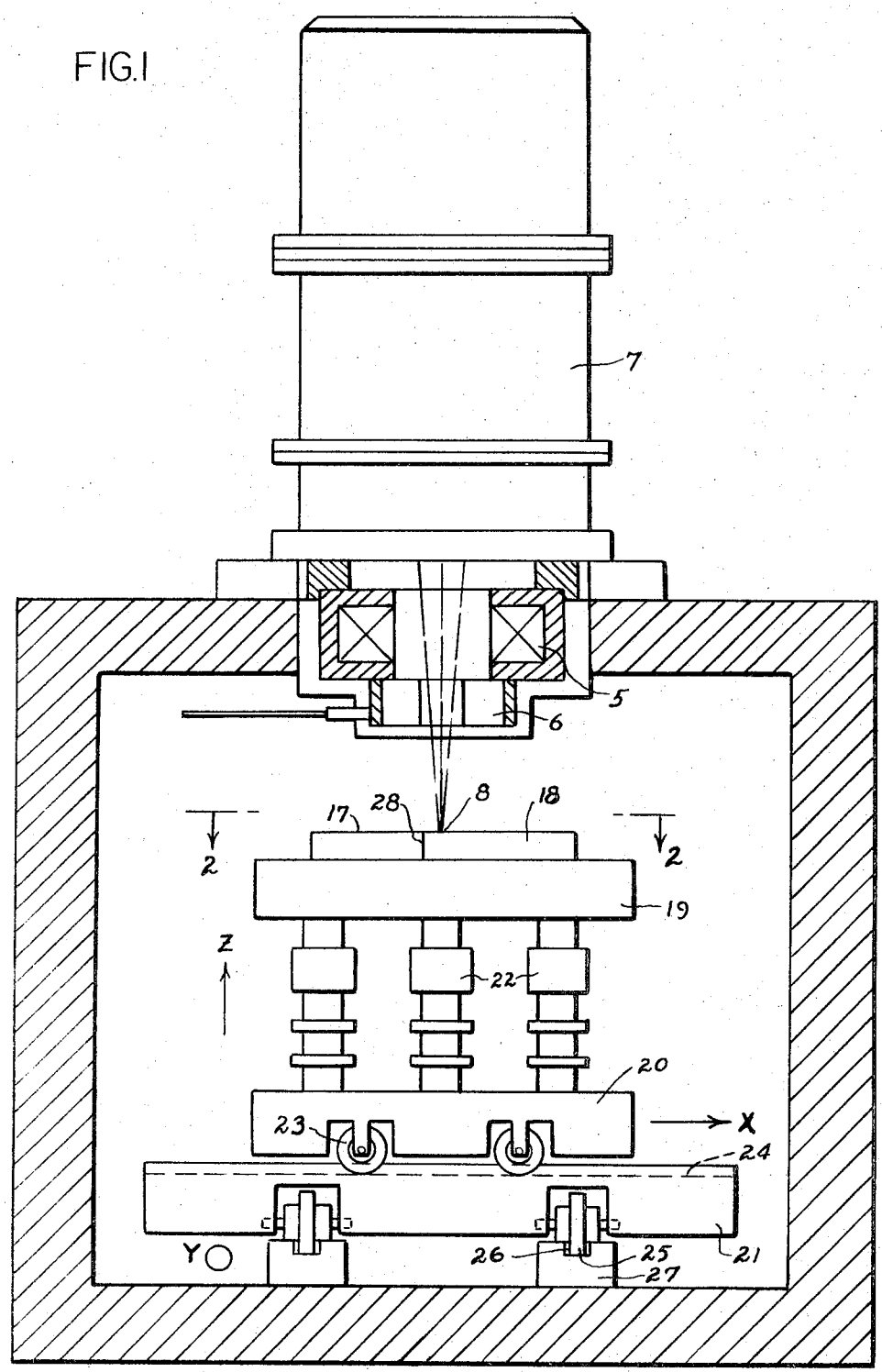
FIG. 1 is a schematic representation of an electron beam processing machine, the working chamber of which comprises a workpiece carrier displaceable with respect to the electron beam.

FIG. 1 illustrates an exemplified embodiment of a device for the workpiece movement in three coordinate directions (x, y, and z axes) with respect to the electron beam arranged in a working chamber 9 of an electron beam welding machine. The electron beam generator 7, the particular structural features of which are explained in greater detail below with reference to FIG. 3, is situated at the upper side of the working chamber 9 and communicates with the interior of the working chamber 9 via an aperture. For clarity's sake, the pump emplacements required for evacuating, respectively, the electron beam generator 7 and the working chamber 9 are not shown in FIG. 1.

The device for the movement of the workpiece within the working chamber 9 essentially consists of two carriages 20 and 21 displaceable with respect to one another. The "X carriage" 20 for the feed of the workpiece is displaceable in the x direction and the "Y carriage" 21 for the feed of the workpiece is displaceable in the y direction. In addition, there is provided a height adjusting device 22 fixedly mounted onto the X carriage, which supports in turn the workpiece carrier 19 and permits its additional adjustment in the z direction. Altogether, the movement mechanism, as described above, therefore permits achieving any movement of the workpiece carrier 19 within the working chamber 9 in the three coordinate directions x, y, and z. The two carriages 20 and 21 run, respectively, on ground tracks 24 and 26 with the wheels 23 and 25 guiding the respective carriages.

In the present exemplified embodiment, the Y carriage 21 substantially consists of 2 girders arranged parallel to one another in the x direction in the surface of which there have been recessed the tracks 24 for the X carriage 20. Two additional girders 27 running at an angle of 90° with the girders of the Y carriage 21 lie on the floor of the working chamber 9 and comprise at their surfaces the tracks 26 for the wheel pairs 25 of the Y carriage.

For the respective drives of the X and Y carriages, there has been provided variable electric motors arranged beneath the working chamber 9. For the power transmission between the various shafts of the electric motors and the X and Y carriages one uses precision chains and gears, thereby guaranteeing a power transmission substantially free of play.

The device for the workpiece movement within the working chamber 9 can, however, be designed also in such a way as to provide, in addition to or as a substitute for the X and Y carriages, rotating devices for generating rotary movements of a workpiece around a vertical and/or a horizontal axis situated parallel to the x direction. Such rotary devices are necessary, for example, in those cases in which circular welding is to be performed (welding of circular seams).

The main purpose of the height adjustment device 22 is the adjusting of the operating distance between the workpiece carrier 19 and the beam outlet aperture of the electron beam generator 7 prior to the initiating of the machining process.

The movement of the workpiece in the x/y plane during the actual machining cycle achieved by means of the transportation device illustrated in FIG. 1 is explained in further detail hereinafter.

Figure 2:
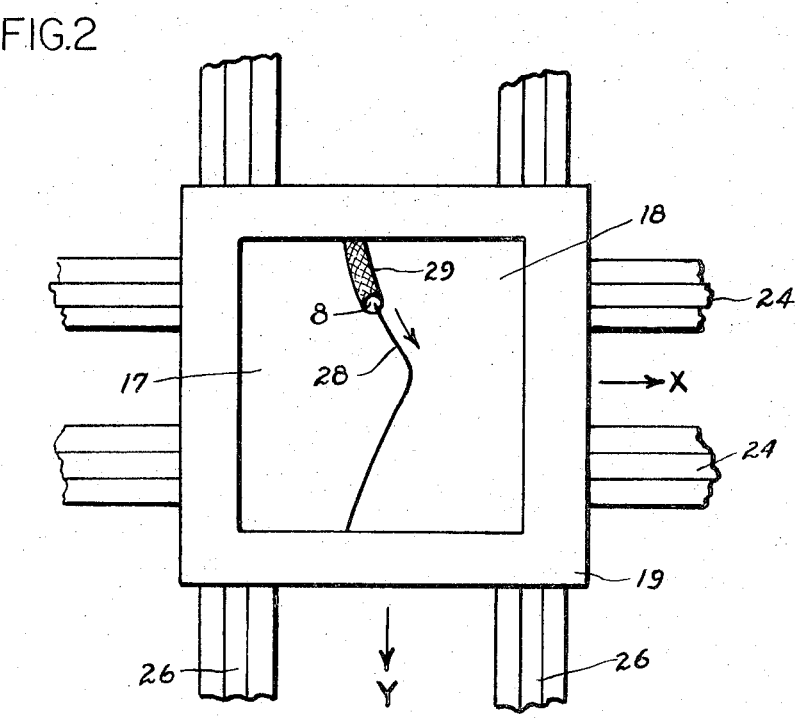
FIG. 2 is a cross section on the line 2—2 of FIG. 1.

FIG. 2 illustrates along the section in the plane 2—2 of FIG. 1, a top view of two workpieces 17 and 18 lying on the workpiece carrier 19. The workpieces to be electron-beam butt-welded along their junction line 28 running with a bend along their mutual contact area. The setting of the workpiece carrier 19 in the z direction is adjusted in such a way that the work area 8 of the electron beam focused by the magnetic lens 5 has its required position on the surface of the two workpieces 17 and 18 in the area of the welding joint to be produced. The focus of the electron beam is preferably placed by a certain amount beneath the surfaces of the workpieces 17 and 18. The formation of the curved path welding seam shown in FIG. 2 along the junction line 28 of the two workpieces at constant position of the work area 8 now requires such a control of the movement of the workpiece carrier 19 and hence of the two workpieces 17 and 18 that the momentary welding zone produced under the effect of the electron beam (work area 8) continuously travels on along the path of the line 8, leaving behind a curved junction line 29. This is brought about through an overlapping or superpositioning of the movement of the X and Y carriages of the transportation device, the generating of these movements being automatically controlled preferably according to a program.

Particulars of the method according to the invention for the control of the movement of a workpiece with respect to the beam of an electron beam stock processing machine are now described in detail with reference to FIG. 3.

FIG. 3 illustrates as an axial cross section, an exemplified embodiment of an electron beam generator essentially comprising an electron beam source, electronic optical components, an optical eyepiece or viewer system, and a deflection system. The corresponding working chamber is not shown in FIG. 3 in view of the fact that such a chamber is illustrated already in FIG. 1.

The actual beam generating system is designed as a triode and is situated within a hollow cylindrical insulating body 1 surrounded on its outside at a certain spacing by a grounded sheet metal casing 2.

In the interior of the insulating body 1 there is arranged a cathode system connected to a high voltage network, affixed to the insulating body 1 by means of a carrier ring and consisting mainly of a V-shaped heated cathode 33 and a control electrode 32 surrounding the latter. The cathode 33 itself is situated at the end of a cartride shaped carrier 30.

The upper part of the insulating body 1 is provided with a readily detachable closure 3 consisting, likewise, of insulating material.

A plug connection 43 laterally inserted in the insulating body 1 serves for the connection of the cathode system to its respective high voltage supply line.

The cathode system is followed by a perforated anode 31 which is at ground potential.

In the space between the insulating body 1 and the housing jacket 2, there are arranged adjusting coils 34 for the beam adjustment. The arrow 35 suggests the direction of the accelerated electron beam emerging from the anode borehole.

The electron beam generator comprises further, as viewed in the beaming direction, a stigmator 36, a cooled diaphragm 37, an optical eyepiece or viewer system 4 (in particular to observe the machining area on the workpiece 53 and to inspect the electron beam). In addition the generator comprises an illuminating device 40, a deviating mirror 38 for the beam travel of the viewer system, a deviating mirror 39 for the beam travel of the illuminating device, replaceable vapor protection lenses 41 for the protection of the deviating mirrors 38 and 39 against material vapors originating from the workpiece 53. The generator also includes an insertable measurement sensor 42 for the determining of the electron beam current, a magnetic lens 5 for the focusing of the beam and directly, beneath the latter, deflection coils 6 for the beam deflection.

The housing of the electron beam generator exhibits lastly also a pipe connection 52 for connection to a vacuum pump (not shown). To the above described electron beam generator there is connected — substantially according to FIG. 1 — an evacuatable working chamber that may comprise a workpiece moving control means illustrated very schematically by the reference 44 in FIG. 3 by means of which there can be generated any movement of a workpiece 53 arranged on a workpiece carrier during the machining cycle. The workpiece moving control means 44 may comprise a movement mechanism being designed, for example, as that illustrated in FIG. 1.

The focusing of the electron beam is set in such a way that there is produced a work area 8 with the most narrow beam cross section in the machining zone directly on the surface of the workpiece 53.

The movement of the workpiece 53 during the machining cycle is automatically controlled according to a program stored in a digital computer 10 and containing the working track parameters, from which the digital computer continuously calculates a preset position of the workpiece at any given moment. The corresponding control signal is fed to the workpiece moving control means 44 via a line 15 and the workpiece 53 is then moved under control of the workpiece moving control means 44 as a function of the preset position. The control signals of the digital computer 10 are transmitted to the workpiece moving control means 44 by intermediary of a decoder/coder 11, a photo coupler 13 and a coder/decoder 12. The decoder/coder 11 is an interface between the digital computer 10 and the photo coupler 13 by means of which the electronic control signals are transformed to electromagnetic waves within the optical frequency range to thereby perform a signal transmission free of interference impulses between the electronic digital computer 10 and the electron beam processing machine because of the high electrical potential difference between the computer and the electron beam processing machine. The decoder/coder 11 serves as a signal distributor and as a signal-shaping unit before and after the signal transmission through the photo coupler 13. On the other hand, the optical signals received by the coder/decoder 12 after being retranslated to electronic signals are stored and distributed by the coder/decoder 12. First of all, a digital control signal is fed to the workpiece moving control means 44 via line 15 as already mentioned above. During the movement of the workpiece 53 under control of the workpiece moving control means 44 there is being performed continuously a comparison between preset and actual values with regard to the position of the workpiece 53 at any given moment to thereby determine any deviation of the actual position of the moving workpiece at that given moment from the preset position. For this purpose, there are provided two odometrical systems to perform a continuously measuring of the actual position of the moving workpiece at any given moment during the machining cycle. One of these odometrical systems will now be described with reference to FIG. 3. The odometrical system substantially comprises a light source 45, a condenser 47 for the formation of a parallel light beam 46, a light-transmissive graduated rod 51 for the X coordinate and connected with the workpiece moving control means 44, a convergent lens 48, a photoelectric receiver or sensor 49 and an amplifier 50 for the amplifying of the electric signals emitted by the receiver 49. This one of the odometrical systems allows a continuous measurement of the actual positions of the workpiece moving control means 44 in the x-direction of motion and therefore a continuous determination of the actual positions of the workpiece 53 being moved under control of the workpiece moving control means 44 in the x-direction. There is provided a second odometrical system for a continuous measurement of the actual positions of the workpiece moving control means 44 in the y-direction of motion. This further odometrical system comprising the same components as described in the above is not shown in FIG. 3. The light-transmissive graduated member of the second odometrical system for the y-coordinate is connected with the workpiece moving control means 44 at right angle to the rod 51 connected with the workpiece moving control means 44 in the x-direction. The second odometrical system allows therefore a continuous determination of the actual positions of the workpiece 53 being moved under control of the workpiece moving control means 44 in the y-direction. Consequently, by means of the two odometrical systems, one of which is shown in FIG. 3, appropriate feedback signals representing the actual position of the moving workpiece at any given moment during a machining cycle can be generated for the digital computer 10. These signals amplified by the amplifier 50 are fed first via a line 14 to the coder/decoder 12 and then via the photo coupler 13 to the decoder/coder 11 and from the latter into the digital computer 10. Based on the feedback signals of the two odometrical systems, the computer 10 continuously compares the actual position of the moving workpiece 53 at any given moment during a machining cycle with the preset position and calculates the deviation of the actual position at that given moment from the preset position of the workpiece 53. Furthermore, the digital computer 10 supplies control signals for compensating the deviations by controlling the workpiece moving control means 44. Simultaneously, there are then generated electrical control signals in the digital computer 10, signals which control the adjustment of the electron beam. Particularly, the computer 10 supplies control signals which serve via line 16 for the control of the deflection coils 6 in such a way that the point of incidence of the electron beam on the workpiece 53 will be adjusted relative to the moving workpiece to compensate for at least such deviations of the actual position of the moving workpiece 53 from the preset position resulting from the inertia of the workpiece moving control means 44. The control signals controlling the deflection coils 6 of the electron beam are fed first to the decoder/coder 11 serving as a signal distributor and as a signal-shaping unit and then via the photo coupler 13 to the coder/decoder 12 serving as a storage unit and as a digital-analog-converter to provide appropriate analogous signals for the deflection coils 6. In this way, the preset position of the workpiece moving control means 44 and thus of the workpiece 53 at a given moment with respect to the point of incidence of the electron beam on the workpiece is achieved by an adjusting or correcting this point of incidence of the beam. What is essential is that the method according to the invention, guarantees at any given moment of the machining cycle, an uniform power input on the workpiece and that the machining result can therefore not be influenced by any disturbances or fluctuations with regard to the relative movement of the workpiece caused by the inertia of the workpiece moving control means 44.

In the preceding description in connection with FIG. 3, it was presupposed that the actual position of the moving workpiece 53 at any given moment during a machining cycle is to be determined by the determining of the actual position of the workpiece moving control means 44 at any given moment by means of the two odometrical systems connected with the workpiece moving control means 44 and serving as x- and y-coordinate measuring systems as described in the above, because the workpiece 53 could be arranged on the workpiece carrier forming part of the workpiece moving control means 44 in such a manner that the workpiece position cannot be changed with respect to the workpiece carrier during a machining cycle.

Figure 4:
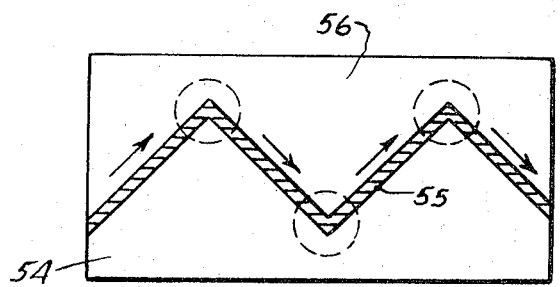
FIG. 4 is a top plan view of two workpieces to be welded to form a Z-shaped butt weld.

FIG. 4 shows, in addition, an example of a substantially Z-shaped butt weld 55 producing a uniform result throughout its path between two workpieces 54 and 56 to be welded together, and performed without any problems by means of the process according to the invention. The indicated arrows reproduce the direction of movement of the workpieces during the welding process within the machining chamber of an electron beam welding machine as illustrated, for example, or as substantially shown in FIGS. 1 and 3 respectively. In the zones of the workpieces 54 and 56, marked by dotted circles, the programmed travel of the beam requires changes to be made in the direction of movement by about 90° by the transportation device carrying the workpieces. Since the transportation device, due to its inertia, is not in a position to pass through such directional changes with constant speed, it is possible only by means of the method according to the invention to maintain a chronologically constant power input for the duration of such changes in the machining direction.

In such cases in which the path of the welding seam is precisely present and one knows in advance at what points in time, respectively, at what points of the welding seam path there will be deviations in the position or speeds from the corresponding preset values, therefore requiring a compensation of these deviations through an adjusting of the beam of radiant energy, the function of the computer can be designed also in such manner that a programmed beam adjustment takes place. The quantitatively presettable deviations are in this case put in as known exception values or magnitudes of disturbances in the programming of the numerical control of the computer storage so that this control will automatically compensate for the aforementioned deviations.

What is claimed is:

1. A method for performing work on a workpiece by utilizing a controllable beam of radiant energy comprising the steps of supplying electrical signals which continuously identify a desired position for the workpiece at any given moment during a machining cycle from working track parameters stored in information storage means, generating electrical signals which characterize the actual position of the workpiece at any given moment during said machining cycle, said signals forming the output of position sensor means, continuously comparing said electrical signals identifying said actual position of said workpiece at any given moment during said machining cycle with said desired position in an electrical comparator to develop a difference signal representing any difference between said actual position at that given moment and said desired position, selectively adjusting the point of incidence of the beam of radiant energy on the workpiece relative to the workpiece responsive to said difference signal such that said electron beam is deflected to impinge upon the desired position on said workpiece, and moving said workpiece to the desired position represented by said desired position identifying signals to obviate any difference between the actual and desired workpiece positions thereby returning said beam of radiant energy to an underflected position.

2. A method as in claim 1 wherein said electron beam is selectively deflected by orthogonal axis deflection means, and wherein said beam adjusting step includes means for exciting said orthogonal axis deflection means responsive to said positional difference signal.

3. Apparatus for performing work on a workpiece utilizing a controllable beam of radiant energy, comprising storage means for supplying electrical signals representing a desired position of the workpiece at any given moment during a machining cycle, sensor means for determining the actual instantaneous position of the workpiece at any given moment during said machining cycle, comparator means coupled with said actual position reporting sensor means and said desired position signaling storage means for comparing the actual position of the workpiece at any given moment during said machining cycle with the desired position therefor and for developing a difference signal responsive to any deviation between the actual position of the workpiece at that given moment from said desired position, deflection means responsive to the difference signal output of said comparator means for adjusting the point of incidence of the beam of radiant energy on the workpiece to correspond to the desired position therefor, and workpiece positioning means responsive to the difference signal output of said comparator means for moving said workpiece to the desired position therefor thereby returning said beam of radiant energy to an undeflected position.

* * * * *